US009482174B2

(12) United States Patent
DeAngelis et al.

(10) Patent No.: US 9,482,174 B2
(45) Date of Patent: Nov. 1, 2016

(54) CONTROLLING AN INTERNAL COMBUSTION ENGINE THROUGH MODELING COMPENSATION OF PCV FUEL FLOW DUE TO OIL DILUTION

(71) Applicant: Ford Global Technologies, LLC, Dearborn, MI (US)

(72) Inventors: Joseph Michael DeAngelis, Detroit, MI (US); Michael Ryan Scannell, New Boston, MI (US); Gregory Blin, Chelmsford (GB); Rama Sanghvi, Northville, MI (US); Joseph Lyle Thomas, Kimball, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 14/159,321

(22) Filed: Jan. 20, 2014

(65) Prior Publication Data
US 2015/0204263 A1   Jul. 23, 2015

(51) Int. Cl.
*F02D 41/30* (2006.01)
*F02M 35/10* (2006.01)
*F02D 41/40* (2006.01)
*F02D 41/00* (2006.01)

(52) U.S. Cl.
CPC ............ *F02D 41/30* (2013.01); *F02D 41/003* (2013.01); *F02D 41/40* (2013.01); *F02M 35/10222* (2013.01); *F02D 2200/021* (2013.01); *F02D 2200/023* (2013.01); *F02D 2200/0611* (2013.01); *F02D 2200/0614* (2013.01); *F02D 2200/101* (2013.01); *F02D 2250/08* (2013.01); *F02D 2250/11* (2013.01); *Y02T 10/44* (2013.01)

(58) Field of Classification Search
CPC ...... F02D 41/30; F02D 41/40; F02D 41/003; F02D 2200/023; F02D 2200/021; F02D 2200/0611; F02D 2200/0614; F02D 2200/101; F02D 2250/11; F02D 2250/08; F02M 35/10216; F02M 35/10222; F01M 1/16; F01M 2001/165; F01M 13/00; F01M 13/04
USPC ................ 123/572, 574, 41.86, 184.22, 478; 701/103, 104, 105
See application file for complete search history.

(56) References Cited

U.S. PATENT DOCUMENTS

| | | | |
|---|---|---|---|
| 6,810,858 B2* | 11/2004 | Ito .......................... | F02D 41/047 123/294 |
| 7,063,070 B2* | 6/2006 | Mashiki ................ | F02D 41/047 123/299 |
| 7,269,496 B2* | 9/2007 | Honda ................... | F02D 41/047 123/196 R |
| 7,493,883 B2* | 2/2009 | Takahashi ................ | F01M 1/18 123/196 AB |
| 8,087,233 B2* | 1/2012 | Yokoi ..................... | F01M 11/12 60/277 |
| 8,302,578 B2 | 11/2012 | Schneider et al. | |
| 8,312,847 B2* | 11/2012 | Saito ........................ | F01M 1/10 123/41.01 |

(Continued)

*Primary Examiner* — Grant Moubry
(74) *Attorney, Agent, or Firm* — James Dottavio; Alleman Hall McCoy Russell & Tuttle LLP

(57) ABSTRACT

A method for controlling an internal combustion engine based on the amount of un-burned fuel dissolved in the engine oil, and returned into the manifold through the PCV valve as the engine oil temperature rises via adjusting fuel injection into a cylinder from a fuel injector, in a fuel delivery system. The fuel dilution in engine oil and the amount of fuel entering the intake manifold through the PCV valve can be determined based on one or more of oil volume, fuel composition (e.g., ethanol content), oil temperature, engine temperature, engine speed, engine load, engine run time, injected fuel mass, and exhaust gas composition.

18 Claims, 4 Drawing Sheets

(56) References Cited

U.S. PATENT DOCUMENTS

| | | | |
|---|---|---|---|
| 8,322,322 B2* | 12/2012 | Saito | F01M 1/10 123/196 A |
| 8,490,607 B2* | 7/2013 | Ghafari | F02D 41/30 123/557 |
| 8,915,236 B2* | 12/2014 | Ramappan | F02B 1/12 123/568.11 |
| 9,014,948 B2* | 4/2015 | Miura | F02D 35/025 701/105 |
| 2004/0099252 A1* | 5/2004 | Nagaishi | F02D 35/025 123/480 |
| 2011/0282539 A1* | 11/2011 | Inoue | F01M 13/022 701/31.4 |
| 2012/0042845 A1 | 2/2012 | Kanai | |
| 2013/0013177 A1 | 1/2013 | Schneider et al. | |
| 2013/0268182 A1 | 10/2013 | Treharne et al. | |

* cited by examiner

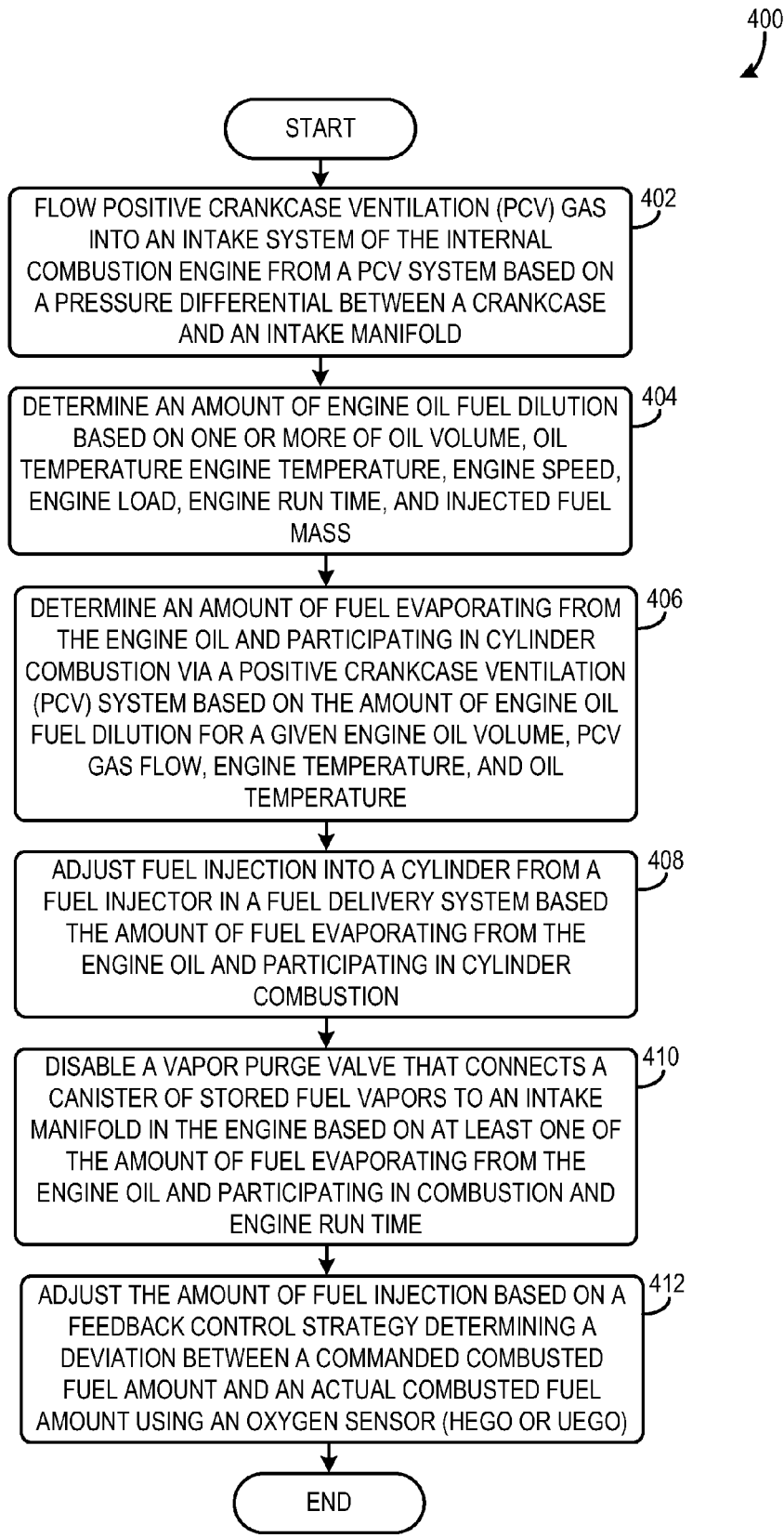

CONTROLLING AN INTERNAL COMBUSTION ENGINE THROUGH MODELING COMPENSATION OF PCV FUEL FLOW DUE TO OIL DILUTION

FIELD

The present disclosure relates to a system and method for controlling fuel injection in an engine based on an amount of engine oil fuel dilution.

BACKGROUND AND SUMMARY

Fuel injection is metered into cylinders to provide a desired power output of an engine. Specifically, fuel may be provided to cylinder in the engine via direct injection and/or port injection. However, fuel may flow past the piston into a crankcase housing engine oil. This fuel may contaminate oil in the engine. This contaminated engine oil may affect various engine systems such as the engine lubrication system as well as the PCV and fuel delivery system. Specifically, fuel (e.g., fuel vapor) from the crankcase may flow through the PCV system into an engine intake conduit. This fuel vapor may not be accounted for in the fuel injection system, which may lead to inefficient and degraded combustion operation which may result in misfires, stalls (e.g., rich stalls), hesitations (e.g., lean hesitations at tip-in) etc.

U.S. Pat. No. 8,302,578 discloses a system and method for determining oil fuel dilution in a diesel engine. If the oil fuel dilution surpasses a threshold amount an oil change indicator may be switched on. The inventors have recognized several disadvantages with system and method disclosed in U.S. Pat. No. 8,302,578. Firstly, a vehicle operator may not notice or in some cases disregard an oil change indicator for an extended period of time. As a result, engine lubrication may be degraded during this period of engine operation. Moreover, engine's using positive crankcase ventilation (PCV) systems may also be impacted via oil dilution from engine fuel slipping past the piston during combustion. Fuel may slip past the piston via fuel remaining on the walls of the cylinder during combustion. Therefore, unmetered fuel passing through the PCV system may cause a number of undesirable engine operations such as stalls, degraded starts, delays during start-up, etc. This problem may be exacerbated when fuels with alcohol are used, such as ethanol blends (e.g., E10, E85, and E100). This problem may also be of particular concern in hybrid vehicles where the engine may only be operated for a limited duration during vehicle travel. Therefore, the oil may be contaminated by a large amount of fuel before the oil is sufficiently heated to allow for evaporation of the fuel from the oil. As a result, the oil may have degraded performance and combustion may be reduced in such engines from unmetered fuel entering the intake and cylinder as the oil heats up evaporating the diluted fuel.

The inventors herein have recognized the above issues and developed a method for controlling an internal combustion engine based on fuel dilution in engine oil comprising adjusting fuel injection into a cylinder from a fuel injector in a fuel delivery system based on an amount of engine oil fuel dilution of oil stored in an oil reservoir, the amount of engine oil fuel dilution determined based on one or more of oil volume, oil temperature, engine temperature, engine speed, and engine load. In this way, oil dilution via fuel may be accounted for when determining an amount of fuel injected into a combustion chamber. As a result, combustion efficiency is increased and the likelihood of misfires and stalls are reduced.

The method may further include selectively flowing positive crankcase ventilation (PCV) gas into an intake system of the internal combustion engine from a PCV system, in some examples. Further in some examples, adjusting fuel injection into the cylinder based on the amount of engine oil fuel dilution includes adjusting fuel injection into the cylinder based on an amount of fuel evaporating from the oil and participating in combustion via the PCV system. In this way, the likelihood of combustion degradation during PCV purge operation can be reduced, thereby improving combustion operation.

The above advantages and other advantages, and features of the present description will be readily apparent from the following detailed description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 4 shows a method for operating an engine.

DETAILED DESCRIPTION

A system and method for adjusting fuel injection based on an amount of engine oil contamination is described herein. Specifically, in one example an amount of fuel injection is altered during flow through the positive crankcase ventilation (PCV) system based on an estimated amount of fuel vapor in the PCV gas. A number of variables may be used to determine engine oil dilution as well as the amount of fuel vapor in the PCV gas. For example, the oil volume, oil temperature, PCV valve flow characteristics, engine temperature, engine run time, engine speed, and/or engine load may be used to determine the amount of fuel dilution in the engine oil. Other parameters which may be used to determine engine oil fuel dilution may include fuel composition (e.g., ethanol content, volatility of fuel, etc.), amount of fuel being injected, duration since last oil change, and/or exhaust gas composition. In this way, a number of parameters may be used to determine oil dilution to increase the accuracy of the oil dilution determination. Furthermore, by correcting fuel injection based on fuel dilution in the engine oil enables combustion operation, during for example positive crankcase ventilation (PCV) operation, to be accurately controlled. As a result, the likelihood of degraded combustion from unaccounted for fuel from the PCV gas can be reduced, if desired. In this way, the efficiency of combustion may be increased, emissions may be reduced, and the likelihood of stalls, misfires, etc., is also reduced.

Figure 1:
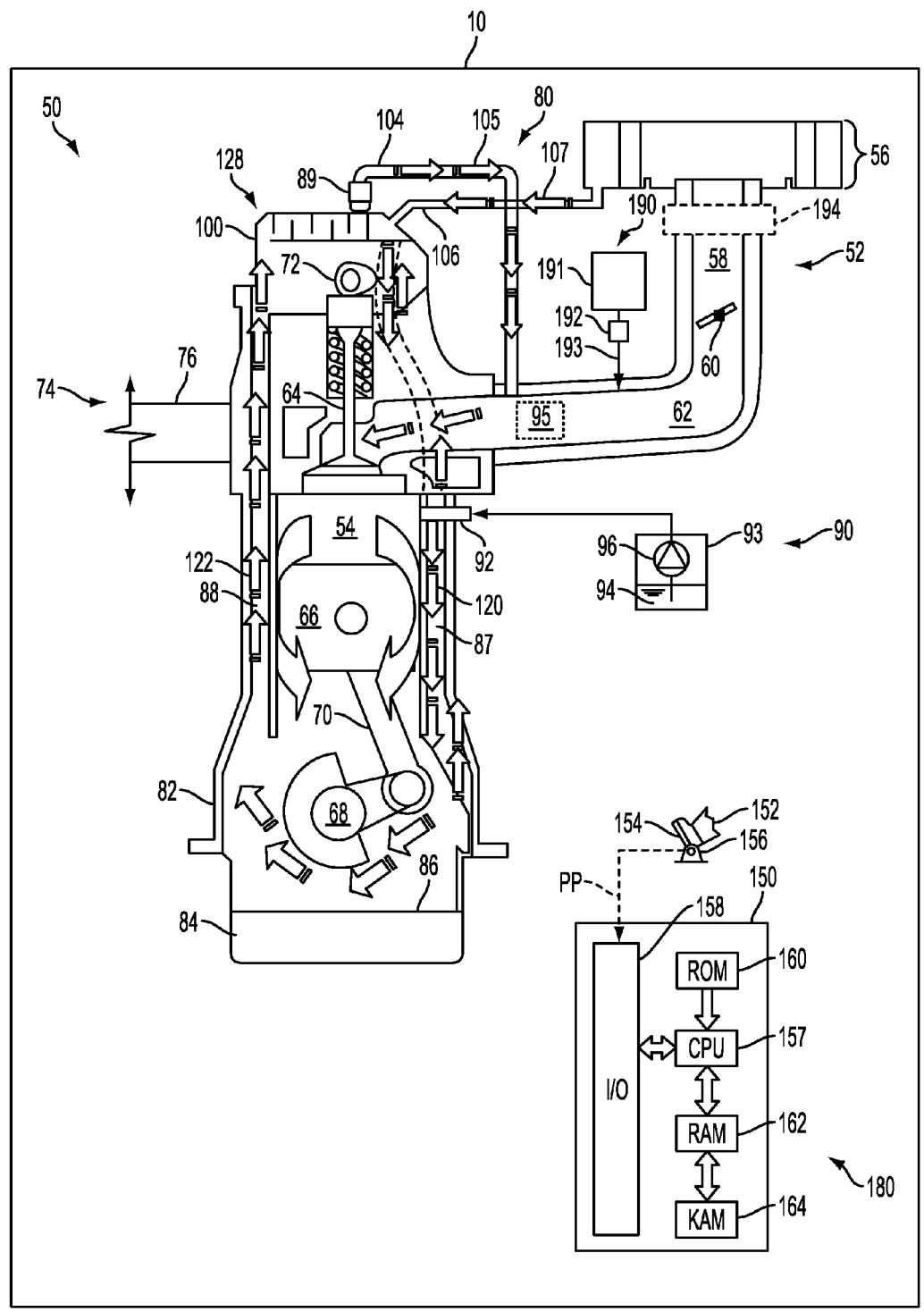
FIG. 1 shows a schematic depiction of an engine having a positive crankcase ventilation (PCV) system.

FIG. 1 shows a schematic depiction of an engine 50. The engine 50 may be included in a vehicle 10. It will be appreciated that in some examples the vehicle may further include an electric motor (not shown) coupled to the engine 50. In some examples, the electric motor may directly provide motive power to wheels in the vehicle. Additionally, the engine 50 may also directly provide motive power to the wheels in some examples. However, in other examples the engine 50 may be directly coupled to the electric motor. It will be appreciated that a variety of hybrid vehicle configurations have been contemplated. For instance, parallel, mild-parallel, series, and plug-in hybrid configurations have been contemplated.

The engine 50 includes an intake system 52 providing air to a cylinder 54. Although a single cylinder is depicted in FIG. 1, it will be appreciated that alternate cylinder quantities and cylinder arrangements have been contemplated. For instance, the engine may include two or more cylinders. The cylinders may be arranged in banks in a V-type configuration, the cylinder may be arranged in a horizontally opposed configuration, an inline configuration, etc. Furthermore, a multi-stroke combustion cycle may be implemented in the cylinder 54. For instance, four or two stroke combustion cycles have been contemplated.

The intake system 52 includes air inlet chamber 56. The inlet chamber 56 may include a filter. The intake system 52 further includes an intake conduit 58, a throttle 60, and an intake manifold 62. The throttle 60 is configured to adjust the amount of airflow through the intake manifold 62. The throttle 60 may be in electronic communication with a controller 100, described in greater detail herein. The intake system 52 further includes an intake valve 64. The intake valve 64 is depicted as a poppet valve in the example shown in FIG. 1. However, alternate intake valve types have been contemplated.

A piston 66 is positioned in the cylinder 54. The piston 66 is configured to move in reciprocating motion in the cylinder to increase and decrease the size of the combustion chamber during engine operation. The piston 66 is coupled to a crankshaft 68 via a piston rod 70. In energy generated via combustion operation may be translated to the crankshaft as rotational motion.

A valve actuation mechanism 72 is also included in the engine 50. In the depicted example, the valve actuation mechanism 72 is a cam. However, other types of valve actuation may be utilized. For instance, electronic valve actuators may be used, if desired. Further still variable valve actuation system may also be included in the engine, if desired.

The engine 50 also includes an exhaust system 74. The exhaust system 74 includes an exhaust conduit 76. The exhaust conduit 76 may be an exhaust manifold, in one example. The exhaust conduit 76 may be in fluidic communication with an exhaust valve (now shown) of the cylinder 54. The exhaust valve may provide selective fluidic communication between the cylinder 54 and the exhaust conduit 76. The exhaust valve may be cam actuated or actuated via an electronic cam actuation system, in other examples. The exhaust system 74 may further include emission control devices such as catalysts (e.g., 3-way catalysts), filters, etc., as well as a muffler.

A positive crankcase ventilation (PCV) system 80 is also included in the engine 50. The PCV system 80 is configured to circulate air through a crankcase 82. The crankcase 82 encloses the crankshaft 68. An oil pan 84 is coupled to the crankcase 82. The oil pan 84 is configured to store engine oil 86. The engine oil may be provided to various engine components for lubrication. The PCV system 80 includes an inlet PCV passage 87 and an outlet PCV passage 88. Both the inlet PCV passage 87 and the outlet PCV passage 88 are in fluidic communication with the crankcase 82. Arrows 120 and 122 denote the general flow of PCV gas through the inlet PCV passage 87 and the outlet PCV passage 88, respectively, during unboosted operating condition, such as when the pressure inside the crankcase is greater than the pressure inside the intake manifold and intake air is flowed into the crankcase and PCV is flowed from the crankcase to the intake system. The PCV system 80 further includes PCV valve 89. As shown, the PCV valve is coupled to a cam cover 100. The cam cover 100 at least partially encloses the cam 72 and may substantially inhibit unwanted gas from flowing to the external environment surrounding the engine 50. The PCV valve 89 is coupled to the outlet PCV passage 88. A PCV line 104 is coupled to the PCV valve 89 and the intake manifold 62. The PCV valve 89 may be configured to open when the pressure differential across the valve exceeds a predetermined value. Additionally, the PCV gas flow through the PCV valve may correlate to the pressure differential across the valve when the valve is opened. In this way, the PCV valve 89 may be passively controlled based on an engine pressure differential. It will be appreciated that the size of the PCV valve may be adjusted for different engine designs prior to engine construction. Arrow 105 denotes the generate flow of gas through the PCV line 104 when the PCV valve 89 is open and providing fluidic communication between the crankcase 82 and the intake manifold 62. Thus, it will be appreciated that PCV gas may flow through the PCV line 104. It will be appreciated that the PCV valve 89 may increase or decrease PCV gas flow to the intake manifold based on the differential in pressure between the crankcase and intake manifold. In turbo applications during boosted conditions, a check-valve may be added to prevent back flow through the PCV valve. Thus, it will be appreciated that the PCV valve may passively regulate the amount crankcase gas outflow. A second PCV line 106 is also coupled to the air inlet chamber 56. The PCV line 106 is in fluidic communication with the inlet PCV passage 87. Arrow 107 denotes the general flow of air through the PCV line 106. In this way, air may be drawn from the intake system and flowed into the crankcase. The PCV valve 89, PCV line 104, and PCV line 106 are included in the PCV system 80. The PCV system 80 also includes an oil separator 128 coupled to the PCV valve 89.

A fuel delivery system 90 is provided in the engine 50. The fuel delivery system 90 is configured to deliver metered fuel to the engine to facilitate combustion operation in the cylinder 54. The fuel delivery system 90 includes a fuel injector 92. The fuel injector 92 is directly coupled to the cylinder 54 in the depicted example. Additionally or alternatively port fuel injection may be provided via the fuel delivery system. Thus, a port fuel injector 95 may be positioned in an intake manifold or intake conduit upstream of the intake valve. The fuel delivery system 90 includes a fuel tank 93 configured to store a fuel 94. A fuel pump 96 is also included in the fuel delivery system 90. The fuel pump 96 is configured to flow fuel from the fuel tank 93 to the fuel injector 92. It will be appreciated that the fuel delivery system 90 may also include a filter, a higher pressure fuel pump, valves, etc.

The engine 50 further includes a vapor purge system 190 including a canister 191 and a vapor purge valve 192. Arrow 193 denotes the connection between the vapor purge valve 192 and the intake manifold 62. The canister 191 is configured to store fuel vapor from the fuel delivery system 90. Thus in one example, the canister 191 may be in fluidic communication with the fuel tank 93. The engine 50 may further include a compressor 194 configured to provide boost to the engine. In one example, the compressor 194 may be included in a turbocharger and therefore may be coupled to a turbine configured to receive exhaust gas from the cylinder 54.

A controller 150 may be included in the vehicle 10. The controller 150 may be configured to receive signals from sensors in the vehicle as well as send command signals to components. Various components in the vehicle 10 may be controlled at least partially by a control system including the controller 150 and by input from a vehicle operator 152 via an input device 154. In this example, input device 154 includes an accelerator pedal and a pedal position sensor 156 for generating a proportional pedal position signal PP. The controller 150 is shown in FIG. 1 as a microcomputer, including processor 157 (e.g., microprocessor unit), input/output ports 158, an electronic storage medium for executable programs and calibration values shown as read only memory 160 (e.g., read only memory chip) in this particular example, random access memory 162, keep alive memory 164, and a data bus. Storage medium read-only memory 160 can be programmed with computer readable data representing instructions executable by processor 157 for performing the methods described below as well as other variants that are anticipated but not specifically listed. The controller 150 is configured to send a signal to the throttle 60. The controller 150 is also configured to send a signal to the fuel pump 96, and the fuel injector 92. Thus, the controller 150 is configured to adjust an amount of fuel injected into the cylinder 54. In this way, an amount of metered fuel may be provided to the cylinder 54. The controller 150, fuel injector 92, throttle 60, pump 96, valve 89, as well as sensors in the engine and vehicle may be included in a control system 180 included in the engine 50. PCV valve 89 may be designed to increase the PCV gas flow in response to a decrease in manifold vacuum during engine operation. Conversely, PCV gas flow may be increased in response to a decrease in manifold vacuum.

Figure 2:
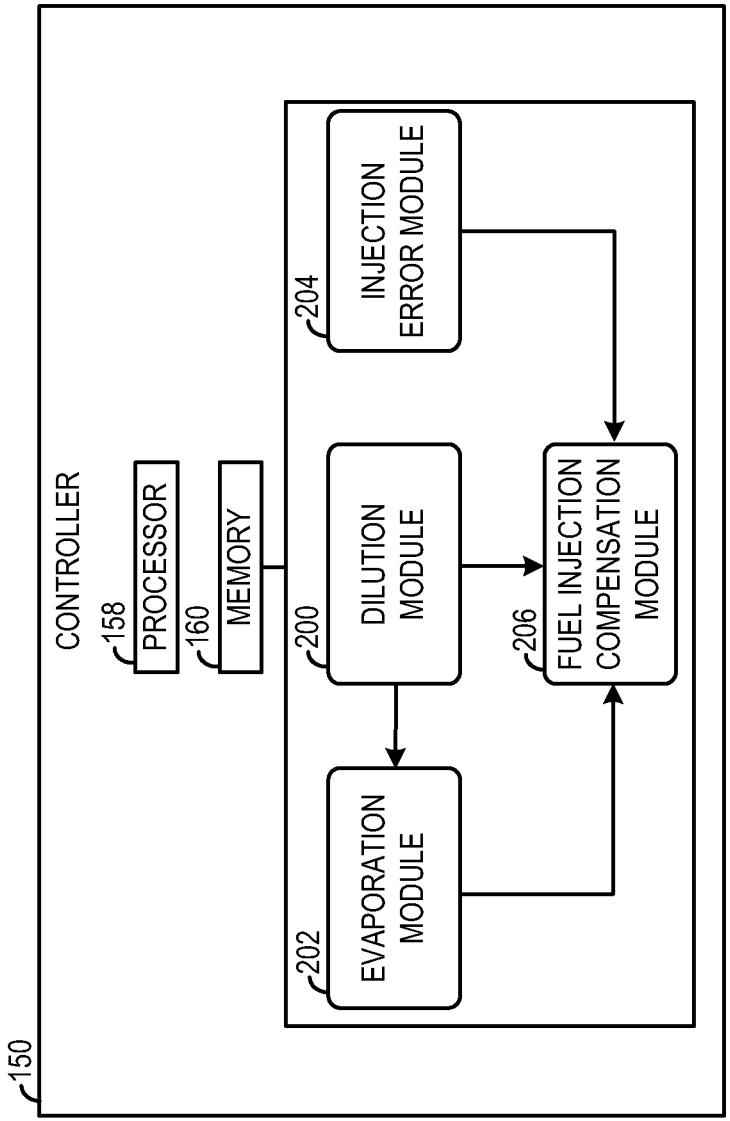
FIG. 2 shows a depiction of an example controller architecture included in the engine shown in FIG. 1.

FIG. 2 shows a schematic depiction of a programmatic architecture which may be in the controller 150 shown in FIG. 1. However, it will be appreciated that other programmatic architectures in the controller have been contemplated. It will also be appreciated that the modules shown in FIG. 2 may be stored in non-transitory memory executable via a processor. The modules are described as having various programmatic functionalities as discussed in greater detail herein.

The controller 150 includes a dilution module 200 configured to determine an amount of fuel diluted in the engine oil that has slipped past the piston (e.g., piston ring). It will be appreciated that the engine oil may be stored in an oil reservoir such as the oil pan 84 shown in FIG. 1. The dilution module 200 may use various inputs to determine the amount of engine oil fuel dilution. The dilution module 200 may determine oil dilution based on various parameters such as engine temperature, oil temperature, engine speed, engine load, oil change duration, fuel type, time since starting the engine and/or difference between the injected fuel and the calculated or measured fuel that has been combusted. However, in other examples the dilution module 200 may determine the amount of fuel dilution in the engine oil from an oil composition sensor. Additionally or alternatively, the engine oil fuel dilution may be determined based on oil change interval, and/or engine run time. In one example, the engine oil fuel dilution may be determined based on crank fuel at start and a factor multiplied by lost fuel. It will be appreciated during engine start-up a percentage of the fuel injected into the cylinder ends up in the engine oil. The lost fuel may be determined based on the different between a final fuel request before transient fuel and an amount of fuel required for combustion. The final fuel request may be calculated from a parameter which includes a closed loop correction. In one example, a 3-dimensional table may be used to determine an amount of fuel flowing into the oil and slipping past the piston.

The controller 150 further includes an evaporation module 202 configured to determine an amount of fuel evaporating from the engine oil and participating the combustion process via the PCV system 80, shown in FIG. 1. The evaporation module 202 may use various parameters to determine the amount of fuel evaporating from the fuel such as engine temperature, ambient temperature, oil temperature, PCV gas flowrate, engine speed, engine load, oil change duration, fuel type, amount of fuel diluted in the oil and/or the total volume of the oil. The parameters may include signals from sensors as well as algorithmically determined values. It will be appreciated that the fuel vapor flow through the PCV valve may be a fraction of the overall PCV gas flow and may be a function of the oil temperature. Further in some examples, the ethanol learning in the control strategy may be limited to decrease the likelihood of incorrect ethanol content being calculated. Furthermore, the amount of fuel evaporated from the oil and participating in combustion may be compensated for via a feedforward control strategy for fuel injection metering. In some examples, the amount of fuel in the PCV gas may linearly correlate to the oil temperature. However, other correlations are possible. Thus, the evaporation module may determine feedfoward fuel compensation via a model. The feedforward model may determine a percentage of PCV flow that is fuel. The percentage may be determined by taking a ratio of the amount of fuel accumulated in the oil to a nominal amount of fuel. The percentage of PCV flow that is fuel may then be multiplied by the PCV flow to determine the fuel flow in the PCV gas. It has been found that it may be more beneficial to under predict the feedforward compensation value than over predict the feedforward compensation value because over prediction may cause lean fuel injection amounts.

The controller 150 further includes an injection error module 204 configured to determine the error in commanded fuel injection through the fuel injector 92, shown in FIG. 1. Specifically, the controller 150 may adjust the fuel injection based on various parameters, such as engine oil dilution, in one example. It will be appreciated that adjusting fuel injection may include adjusting a fuel injection amount and/or fuel injection timing. Thus, the amount of fuel injection may be increased or decreased and/or the timing of fuel injection may be advanced or retarded when fuel injection is adjusted. The injection error module 204 may use input signals from exhaust gas sensors, such as exhaust gas oxygen sensor, exhaust gas composition sensors, etc. The injection error module may utilize a feedback algorithm to determine errors in the feedfoward fuel injection strategy. Thus in some examples, the amount of fuel injection may further be corrected via a feedback control strategy which may take into account for fuel evaporating from the oil that is not accounted for by feedforward control. Specifically, the feedback compensation may be used to account for the under or over prediction of the feedforward compensation and may be a measure of success of the feedforward strategy.

The amount of fuel accumulation in the oil and the temperature of the oil may be accounted for in the feedback strategy. Specifically, a closed loop trim in the strategy may be filtered via a time constant and converted into a fuel mass flowrate. The fuel mass flowrate may be compared to the current flowrate in the PCV system and a factor may be calculated. This factor may be filtered using time constants based on engine temperature, fuel pump flow rate, and total PCV flowrate. The time constants may be tuned based on the signals from the throttle. For instance, the time constants may decrease with an increasing engine temperature which may account for errors in the lost fuel. The filter factor may then be multiplied by the PCV flow to determine an amount of fuel that is not accounted for via the feedforward compensation calculation. Further still in one example, a term in the feedback control strategy may be determined to calculate the impact of fuel flow from the PCV system on the fuel injectors. The feedback compensation value may be limited to a range of +20% to −10% correction of an amount of injected fuel, in one example. This limitation may be implemented during cold starts and/or other driving conditions. In other example, the feedback compensation value may be limited to the range of 0-5% correction of an amount of injected fuel. Further still in other examples, the feedback compensation value may not exceed +/−3%.

The outputs from the injection error module 204, the evaporation module 202, and the dilution module 200 may be sent to a fuel injection compensation module 206 configured to determine the amount of fuel injected from the fuel injector 92, shown in FIG. 1. Specifically in one example, the fuel injection compensation module 206 may compensate the amount of desired fuel injected based on an amount of engine oil fuel dilution. For instance, the fuel injection compensation module 206 may increase an amount of fuel injection when the amount of fuel evaporating from the engine oil decreases and conversely decrease an amount of fuel injection when the amount of fuel evaporating from the engine oil increases. In this way, fuel in the PCV gas flow may be accounted for thereby increasing combustion efficiency and decreasing the likelihood of unwanted combustion events such as knocks, misfires, etc. As a result, emissions from the engine may be reduced and/or power output from the engine may be increased. It will be appreciated that the fuel injection controller may set a fuel injection amount to be less than a PCV flow amount. It will be further appreciated that a base fuel injection amount may be determined via the fuel injection compensation module 206 based on user input from an acceleration pedal or other suitable acceleration input device. Further in some examples, the amount of fuel in the oil may be recalibrated during each engine start. In this way, the accuracy of the fuel dilution may be increased. It will be appreciated that both the feedfoward and feedback compensation values may be combined (e.g., added together) to determine an amount of fuel injection compensation based on an amount of fuel vapor in the PCV gas. Furthermore, the fuel accumulation amount may be stored in the controller when the engine is shut-down. Additionally, based on the amount of engine oil fuel dilution closing of the vapor purge valve that connects the canister of stored fuel vapors to the intake manifold may occur. The fuel vapors stored in the canister result from evaporation of the fuel in the fuel tank. Fuel adaptives are designed to adjust the amount of fuel delivered in cylinder based on a specific hardware set and variations in fuel, etc. During significant levels of fuel flow from the engine oil through the PCV, the separation of said variables and fuel from the PCV, may not be able to be separated. Therefore, further determination of the fuel adaptives may also be disabled. Furthermore, the feedback strategy discussed above may be disabled for a duration after refueling. Furthermore, a learned fuel composition (e.g., ethanol content) may be slowed down or inhibited when the engine oil fuel dilution surpasses a threshold value. It has been found when this type of fuel compensation control is implemented the likelihood of stall and misfires during restarts is reduced. A learned fuel composition may be slowed or inhibited when one or more or in some cases all of the following conditions are met, mass of fuel in oil is above a threshold value, oil sump (e.g., oil reservoir) temp is hot enough to evaporate fuel from oil via PCV, fuel is being removed by the closed loop controller, the closed loop correction removing fuel is less than a threshold value, and/or current fuel composition alcohol percentage value is higher than a predetermined threshold. When one or more or in some cases all of the aforementioned conditions are met learned fuel composition may be slowed as determined by a calibratible multiplier on the gain for fuel learning. The input to this table may be a ratio of the fuel pump flow rate to the total PCV flow rate. At low values of this ratio, the multiplier may be set to 0; at higher values, the multiplier can be set greater than 0, as the PCV flow may be less significant when compared to the injector fuel flow. If any of the conditions are not met, the multiplier on the gain is set to 1 in the strategy.

Figure 3:
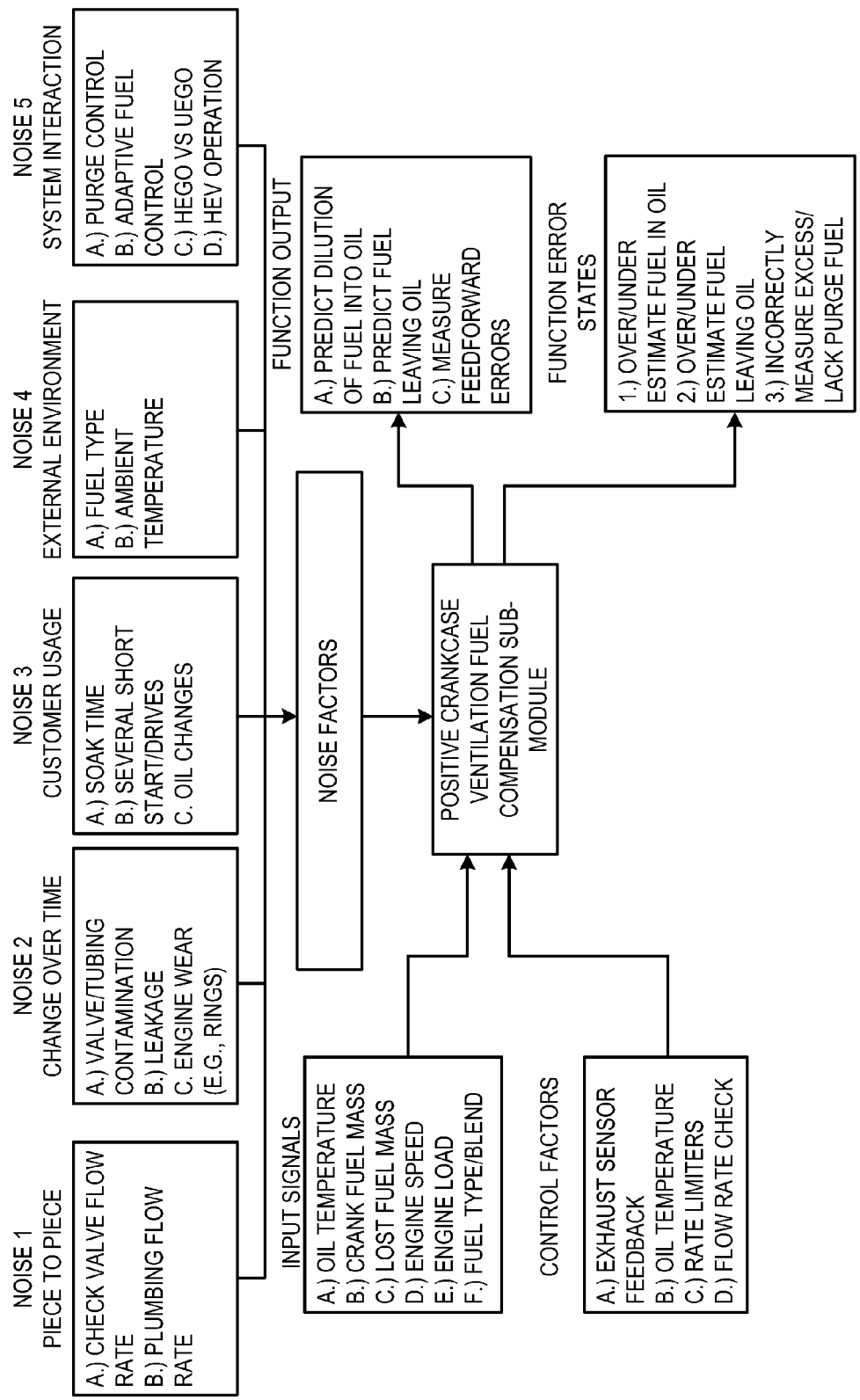
FIG. 3 shows a strategy for determining oil dilution compensation which may be implemented in the controller shown in FIGS. 1-2.

FIG. 3 shows a diagram 300 illustrating various parameters which may be taken into account when determining fuel compensation based on engine oil fuel dilution in PCV gas. The fuel compensation is determined via the fuel injection compensation module 206, shown in FIG. 2 and more generally the controller 150.

As shown in FIG. 3 various noise factors may be taken into account when determining the output of the fuel injection compensation module and specifically the amount of fuel compensation with regard to engine oil fuel dilution. The parameters which may be taken into account when determining noise factors include a check valve flow rate in the fuel delivery system downstream of a fuel pump, a fuel line flow rate, intake valve contamination, fuel leakage, engine wear, soak time, oil changes, fuel type, ambient temperature, purge control, adaptive fuel control, electric motor operation in a hybrid system.

The positive crankcase ventilation fuel compensation for the fuel vapor in the PCV gas flow in the sub-module may be determined based on input signals such as oil temperature, crank fuel mass, lost fuel mass, engine speed, engine load, and/or fuel type/blend. The fuel compensation may also be determined based on control factors such as exhaust sensor feedback, oil temperature, rate limiters, and/or flow rate checks. The positive crankcase ventilation fuel compensation sub-module may be included in the fuel injection compensation module 206 shown in FIG. 2.

Continuing with FIG. 3, the output of the fuel compensation sub-module may be a function including one or more of the following terms predicted dilution of fuel into oil, predicted fuel leaving oil, and feedforward errors. The fuel compensation sub-module also determine uncertainties in the aforementioned terms such as over/under estimate fuel in oil, over/under estimate fuel leaving oil, and/or incorrectly measure excess/lack purge fuel. The aforementioned values may be used to determine an amount of fuel injection adjustment based on the amount of engine oil fuel dilution. It will be appreciated that the amount of fuel compensation determined in the fuel compensation sub-module may be used in a feedfoward fuel injection control strategy where a base fuel injection amount is adjusted based on an expected amount of fuel in the PCV gas.

It will be appreciated that the control system 180 and controller 150 discussed above with regard to FIGS. 1-3 provides for a control system including instructions stored in non-transitory memory executable by a processor for adjusting fuel injection into a cylinder from the fuel injector based on an amount of engine oil fuel dilution in engine oil stored in an oil reservoir, the amount of engine oil fuel dilution determined based on one or more of oil volume, oil temperature, engine temperature, engine speed, and engine load. FIGS. 1-3 further provide for an engine where the fuel injector is included in a fuel delivery system. FIGS. 1-3 further provide for an engine where fuel stored in the fuel delivery system comprises alcohol. FIGS. 1-3 further provide for an engine where the fuel injector is a direct fuel injector directly coupled to the cylinder. FIGS. 1-3 further provide for a control system where adjusting fuel injection into the cylinder based on the amount of engine oil fuel dilution includes adjusting fuel injection into the cylinder based on an amount of fuel evaporating from the oil and participating in combustion via the PCV system. FIGS. 1-3 further provide for a control system where the amount of engine oil fuel dilution is further determined based on one or more of oil change interval, and engine run time.

FIG. 4 shows a method 400 for controlling an internal combustion engine based on a fuel dilution in engine oil is shown in FIG. 4. The method may be implemented via the engine and control system included therein discussed above with regard to FIGS. 1-3 or may be implemented via other suitable engines and control systems.

At 402 the method includes flowing positive crankcase ventilation (PCV) gas into an intake system of the internal combustion engine from a PCV system based on a pressure differential between a crankcase and an intake manifold. In other examples, step 402 may be omitted from the method implemented after subsequent steps, such as the determining steps discussed in greater detail herein.

Next at 404 the method includes determining an amount of engine oil fuel dilution based on one or more of oil volume, oil temperature, engine temperature, engine speed, engine load, engine run time, and injected fuel mass. In one example, the amount of engine oil fuel dilution is further determined based on one or more of oil change interval and engine run time. Further still in one example, the amount of engine fuel dilution is determined based on the composition of the fuel in the fuel delivery system (e.g. an amount of ethanol in the fuel), the way it is injected (e.g., port fuel injected and/or direct in cylinder injection) and/or the amount of fuel injected.

At 406 the method includes determining an amount of fuel evaporating from the engine oil and participating in cylinder combustion via a positive crankcase ventilation (PCV) system based on the amount of engine oil fuel dilution for a given engine oil volume, PCV gas flow, engine temperature, and oil temperature.

Next at 408 the method includes adjusting fuel injection into a cylinder from a fuel injector in a fuel delivery system based on the amount of fuel evaporating from the engine oil and participating in cylinder combustion. In this way, the amount of fuel in the PCV gas may be compensated for in the fuel injection control, thereby increasing the accuracy of fuel injection metering. As a result, combustion efficiency may be increased and the likelihood of misfires, stalls, etc. will be reduced. In one example, adjusting fuel injection includes increasing an amount of fuel injected into the cylinder and decreasing an amount of fuel injected into the cylinder. Further in one example, the step of adjusting fuel injection into the cylinder is implemented while PCV gas flow into an engine intake system in fluidic communication with the cylinder. Further in one example, adjusting fuel injection includes decreasing a fuel injection amount in response to an increasing amount of engine oil fuel dilution for a given engine oil volume, PCV gas flow, engine temperature, and oil temperature. Still further in another example, adjusting fuel injection includes increasing a fuel injection amount in response to a decreasing amount of engine oil fuel dilution for a given engine oil volume, PCV gas flow, engine temperature, and oil temperature.

At 410 the method may include disabling a vapor purge valve that connects a canister of stored fuel vapors to an intake manifold in the engine based on at least one of the amount of fuel evaporating from the engine oil and participating in combustion and engine run time. The fuel vapors stored in the canister result from evaporation of the fuel in the fuel tank.

At 412 the method may further include adjusting the amount of fuel injection based on a feedback control strategy determining a deviation between a commanded combusted fuel amount and an actual combusted fuel amount using an oxygen sensor (HEGO or UEGO).

FIGS. 1-4 provide for a method for controlling an internal combustion engine based on a fuel dilution in engine oil comprising adjusting fuel injection into a cylinder from a fuel injector in a fuel delivery system based on an amount of engine oil fuel dilution of oil stored in an oil reservoir, the amount of engine oil fuel dilution determined based on one or more of oil volume, oil temperature, engine temperature, engine speed, engine load, injected fuel mass, and engine run time. FIGS. 1-4 further provide for a method wherein the amount of engine oil fuel dilution and engine oil volume, PCV gas flow, engine temperature, and oil temperature are used to determine an amount of fuel evaporating from the oil and participating in combustion via the PCV system and the fuel injection is adjusted based on the amount of evaporated fuel participating in combustion. FIGS. 1-4 further provide for a method where the amount of evaporated fuel participating in combustion is determined based on at least one of a feedforward model and feedback model. Thus, in the feedforward control strategy the fuel injection may be adjusted for predicted amounts of fuel vapor in the PCV gas during PCV operation, in one example.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine based on engine oil fuel dilution comprising:
   adjusting fuel injection into a cylinder based on an amount of fuel dilution of oil stored in an oil reservoir, engine oil volume, positive crankcase ventilation (PCV) gas flow, engine temperature, and oil temperature, the amount of fuel dilution determined based on injected fuel mass, oil temperature, engine temperature, engine speed, engine load, engine run time, and fuel composition; and
   prior to adjusting the fuel injection, flowing PCV gas into an intake system of an internal combustion engine from a PCV system based on a pressure differential between a crankcase and an intake manifold;
   the amount of fuel dilution for a given engine oil volume, PCV gas flow, engine temperature, and oil temperature used to determine an amount of fuel evaporating from the oil and participating in combustion via the PCV system, the fuel injection adjusted based on the amount of evaporated fuel participating in combustion.

2. The method of claim 1, where adjusting fuel injection includes decreasing a fuel injection amount in response to an increasing amount of fuel dilution for the given engine oil volume, PCV gas flow, engine temperature, and oil temperature.

3. The method of claim 1, where adjusting fuel injection includes increasing a fuel injection amount in response to a decreasing amount of fuel dilution for the given engine oil volume, PCV gas flow, engine temperature, and oil temperature.

4. The method of claim 1, where the amount of evaporated fuel participating in combustion is determined based on at least one of a feedforward model and feedback model.

5. A method for controlling an engine based on engine oil fuel dilution comprising:
   adjusting fuel injection into a cylinder based on an amount of fuel dilution of oil stored in an oil reservoir, engine oil volume, positive crankcase ventilation (PCV) gas flow, engine temperature, and oil temperature, the amount of fuel dilution determined based on injected fuel mass, oil temperature, engine temperature, engine speed, engine load, engine run time, and fuel composition, and adjusting an amount of fuel injection based a feedback control strategy determining a deviation between a commanded combusted fuel amount and an actual combusted fuel amount.

6. A method for controlling an engine based on engine oil fuel dilution comprising:
   adjusting fuel injection into a cylinder based on an amount of fuel dilution of engine oil stored in an oil reservoir, engine oil volume, positive crankcase ventilation (PCV) gas flow, engine temperature, and oil temperature, the amount of fuel dilution determined based on injected fuel mass, oil temperature, engine temperature, engine speed, engine load, engine run time, and fuel composition, and
   disabling a vapor purge valve that connects a canister of stored fuel vapors to an intake manifold based on at least one of an amount of fuel evaporating from the engine oil and participating in combustion and engine run time.

7. A method for controlling an engine based on engine oil fuel dilution comprising:
   adjusting fuel injection into a cylinder based on an amount of fuel dilution of oil stored in an oil reservoir, engine oil volume, positive crankcase ventilation (PCV) gas flow, engine temperature, and oil temperature, the amount of fuel dilution determined based on injected fuel mass, oil temperature, engine temperature, engine speed, engine load, engine run time, and fuel composition, where the amount of engine fuel dilution is determined based on a composition of fuel in a fuel delivery system, engine temperature, engine speed, engine load, engine run time, and injected fuel mass.

8. An engine comprising:
   a cylinder;
   a fuel injector providing metered fuel to the cylinder; and
   a control system including non-transitory instructions stored in memory executable by a processor for adjusting fuel injection into the cylinder from the fuel injector based on an amount of engine oil fuel dilution in engine oil stored in an oil reservoir, the amount of engine oil fuel dilution determined based on one or more of oil volume, a PCV gas flow, oil temperature, engine temperature, injected fuel mass, fuel type, engine speed, and engine load, wherein adjusting the fuel injection is further based on a feedback control strategy determining a deviation between a commanded combusted fuel amount and an actual combusted fuel amount.

9. The engine of claim 8, where the fuel injector is included in a fuel delivery system.

10. The engine of claim 9, where fuel stored in the fuel delivery system comprises alcohol.

11. The engine of claim 8, where the fuel injector is a direct fuel injector directly coupled to the cylinder or an injected port fuel injector.

12. The engine of claim 8, where adjusting fuel injection into the cylinder based on the amount of engine oil fuel dilution for a given engine oil volume, PCV gas flow, engine temperature, and oil temperature includes adjusting fuel injection into the cylinder based on an amount of fuel evaporating from the engine oil and participating in combustion via a PCV system.

13. The engine of claim 8, where the amount of engine oil fuel dilution is further determined based on an oil change interval.

14. A method for determining an amount of fuel diluting in an engine oil of an internal combustion engine, comprising:
   determining an amount of engine oil fuel dilution based on one or more of oil volume, oil temperature, engine temperature, engine speed, engine load, engine run time, and injected fuel mass;

determining an amount of fuel evaporating from the engine oil and participating in cylinder combustion via a positive crankcase ventilation (PCV) system based on the amount of engine oil fuel dilution for a given engine oil volume, PCV gas flow, engine temperature, and oil temperature, the amount of evaporated fuel participating in combustion determined based on at least one of a feedforward model and feedback model; and adjusting fuel injection into a cylinder from a fuel injector in a fuel delivery system based on the amount of fuel evaporating from the engine oil and participating in cylinder combustion and a feedback control strategy determining a deviation between a commanded combusted fuel amount and an actual combusted fuel amount.

15. The method of claim 14, where adjusting fuel injection includes increasing an amount of fuel injected into the cylinder and decreasing the amount of fuel injected into the cylinder.

16. The method of claim 14, where adjusting fuel injection into the cylinder is implemented while PCV gas flow into an engine intake system is in fluidic communication with the cylinder.

17. The method of claim 14, further comprising disabling of a vapor purge valve that connects a canister of stored fuel vapors to an intake manifold based on the amount of fuel evaporating from the engine oil and participating in combustion.

18. The method of claim 14, where the amount of engine oil fuel dilution is further determined based on an oil change interval.

* * * * *